Feb. 5, 1952 — H. J. HORN — 2,584,452
VEHICLE WHEEL COVER
Filed June 4, 1949
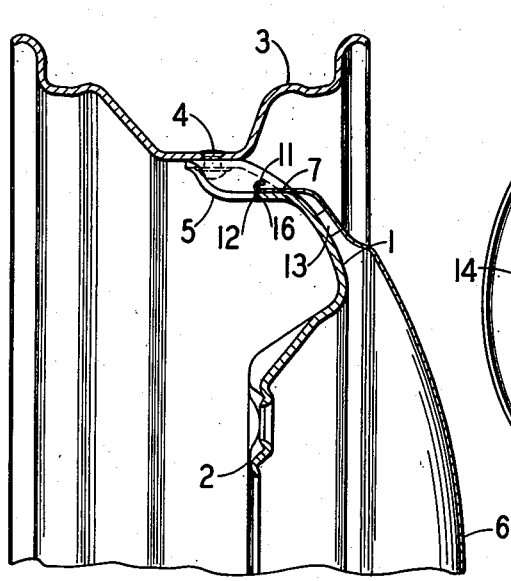
FIG. 2
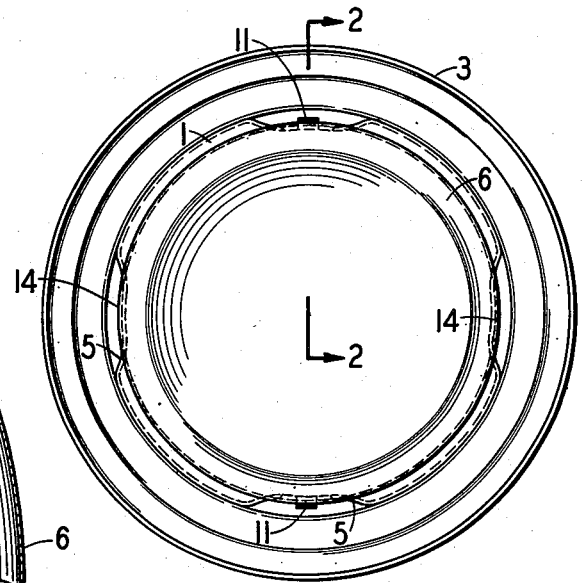
FIG. 1
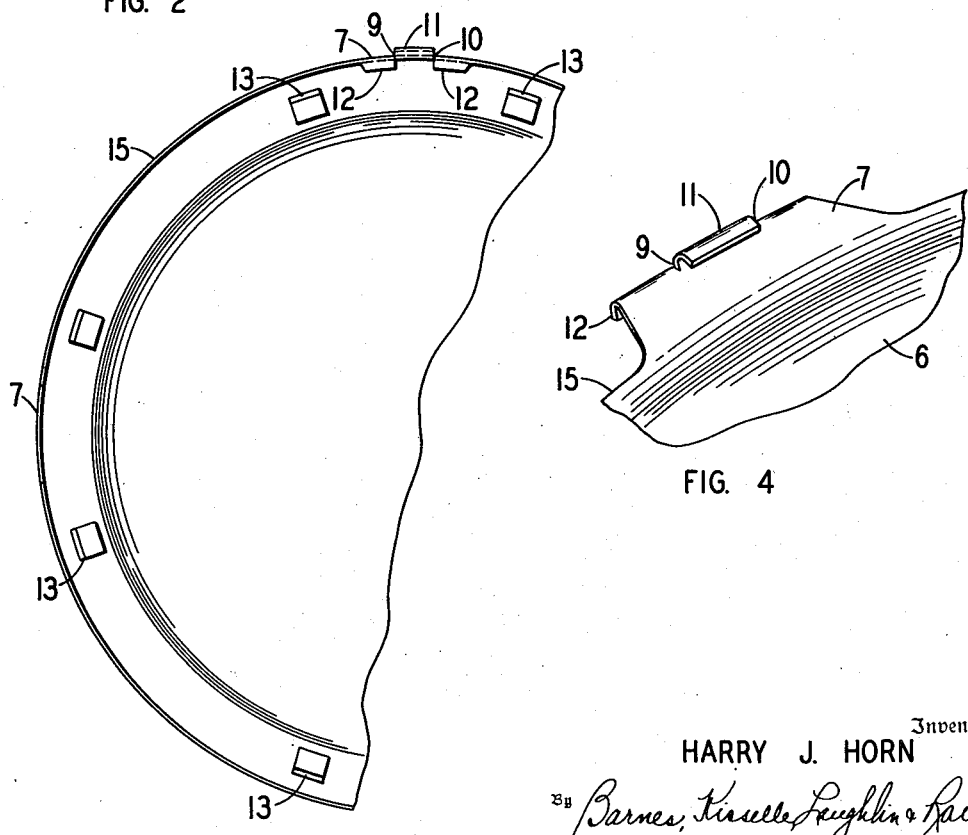
FIG. 3
FIG. 4
Inventor
HARRY J. HORN
By Barnes, Kisselle, Laughlin & Raisch
Attorneys Patented Feb. 5, 1952

2,584,452

UNITED STATES PATENT OFFICE 2,584,452

VEHICLE WHEEL COVER

Harry J. Horn, Lansing, Mich., assignor to Motor Wheel Corporation, Lansing, Mich., a corporation of Michigan Application June 4, 1949, Serial No. 97,203

5 Claims. (Cl. 301—37)

This invention relates to a vehicle wheel cover and is particularly concerned with a detachable wheel cover which can be readily snapped into interengagement with the wheel but which will not be disengaged from the wheel by pounding or vibration such as occurs when the vehicle is rolling over rough and bumpy highway.

It is an object of this invention to produce a detachable wheel cover which is effectively and securely interengaged with the wheel, which can be easily disengaged from the wheel by the use of the proper tool, and which is relatively less expensive to fabricate and more easily attached to the wheel than wheel covers presently in use.

Fig. 1 is a front view of a vehicle wheel showing my cover assembled thereto.

Fig. 2 is a section taken along the line 2—2 of Fig. 1.

Fig. 3 is a view of the inside of the cover, the cover being removed from the wheel.

Fig. 4 is an isometric view showing the construction at the snap-on portion of the cover.

Referring more particularly to the drawings there is shown a vehicle wheel comprising a wheel body 1 having a bolting-on flange 2 by means of which the wheel is bolted to a hub and a rim 3 secured in the usual manner to the body 1 by rivets 4.

The wheel body 1 is provided with a plurality of equally spaced pockets 5 which, for purposes of description, are herein shown as four in number. The cover is designated 6 and can be made of any resilient material such as sheet steel. Cover 6 can be stamped or spun into form which, for purposes of description only, is shown as convex when viewed from the outside of the wheel.

Cover 6 is provided with peripheral projections 7. For purposes of description the cover is provided with four projections 7 to correspond to the four pockets 5 in the wheel body. Projections 7 are preferably equidistantly spaced about the edge of the cover 6 corresponding to the spacings of pockets 5 and at least two of the projections 7 are deformed as described below.

Preferably deformed projections 7 should be diametrically opposed. The other two projections 7 are plain with no deformation on the ends. The two deformed projections 7 are each sheared as at 9 and 10 along their outer edge. The portion 11 between cuts 9 and 10 is turned radially outwardly and then axially rearwardly over the main portion of projection 7. The edge portions 12 on the outside of cuts 9 and 10 are turned radially inwardly so that they interengage edge portions 16 of pockets 5 to releasably lock the cover to the wheel body. Preferably edge portions 12 make a substantially right angle with portion 7. If desired, edge portions 12 can be turned radially inwardly and then axially toward cover 6. Cuts 9 and 10 are preferably located so that portions 11 and 12 are of about the same length taken circumferentially of the cover.

A plurality of elastic rubber blocks 13 are positioned at spaced intervals on the inside of the cover. These blocks 13 are slightly thicker than the space between cover 6 and wheel body 1 at the point at which they are positioned so that when the cover is attached to the wheel the blocks are placed in compression and exert an axial outward pressure on the cover. Blocks 13 can be cemented or otherwise affixed to cover 6.

The cover is assembled to the wheel body by placing one of the resilient projections 7 through an opening 5 in the wheel body and hooking fingers 12 over the inner edge of opening or pocket 5 at this place. The two plain projections 7 slide over the outer face of the wheel body in slightly resilient or spring contact therewith as at 14, Fig. 1, and the other projection 7 is forced over the wheel body and the inwardly bent fingers 12 ride over the wheel body into the diametrically opposite pocket 5 and snap into the position shown in Fig. 2 where they interengage the inner edge of this pocket. The rubber blocks 13 are held in compression and exert an outward axial force on the cover so that fingers 12 which interengage in diametrically opposite openings 5 are drawn yieldably against the inner edges of these pockets.

The cover is removed by placing a screw driver or similar tool in the pocket formed by return bent finger 11 and a radially inward movement of the screw driver which acts as a lever will pull the radially inwardly turned fingers 12 free from the inner edge of pocket 5 and the cover will be loosened so that it can be removed from the wheel. It will be noted that resilient projections or tabs 7 extend axially inwardly from the circumferential edge 15 of the wheel cover 6. Hence, in removing the cover from the wheel, tabs 7 will be flexed radially outwardly to disengage fingers 12 from the inner edge 16 of pocket 5.

I claim:

1. A cover for a vehicle wheel body having a pair of circumferentially spaced resilient diametrically opposite projections each extending axially beyond the circumference of the cover, each projection being sheared axially from its outer edge to provide at least one radially inwardly extending finger at its outer edge and a second finger juxtaposed to said first mentioned finger and bent radially outwardly from the edge of the projection and then axially backwardly over the projection to form a socket adapted to receive a tool for flexing the projection radially outwardly preparatory to removing the cover from the wheel.

2. A cover for a wheel body having at least two circumferentially spaced axially extending resilient projections, each projection having one portion of its edge turned radially inwardly and adapted to interengage an edge portion of the wheel body to releasably secure the cover to the wheel body and another edge portion bent radially outwardly and axially over said projection to form a socket adapted to receive a tool for flexing the projection preparatory to removing the cover from the wheel, and elastic means adapted to be placed under compression between the wheel body and the cover to yieldably retain the radial fingers in interengagement with an edge of the wheel body.

3. A convex sheet metal cover for a vehicle wheel body, said cover having at least two substantially diametrically opposed resilient tabs extending generally axially from the peripheral edge of said cover, each tab having one portion of its outer edge turned radially inwardly to form a finger adapted to interengage an edge portion of the wheel body whereby the interengagement of the opposed tabs with the edge of the wheel body secures the cover to the wheel, at least one of said tabs having another edge portion bent radially outwardly and axially over said tab to form a socket adapted to receive a tool for flexing the tab generally in a radially outward direction to disengage the tab from the edge of the wheel, and elastic means adapted to be placed under compression between the wheel body and the cover to exert an axial thrust against the cover to thereby yieldably retain the radial fingers in interengagement with an edge of the wheel body.

4. The combination claimed in claim 3 wherein the tabs are integral with the cover and wherein the cover includes two plain integral tabs positioned between said fingered tabs and extending axially inwardly from the periphery of said cover and adapted to yieldably engage the wheel body to thereby cooperate with the fingered tabs in maintaining the cover centered on the wheel body.

5. A cover for a vehicle wheel body having a pair of circumferentially spaced resilient projections each extending axially beyond the circumference of the cover, each projection having at least one radially inwardly extending finger at its outer edge and a second finger bent radially outwardly from the edge of the projection and then backwardly over the projection to form a socket adapted to receive a tool for flexing the projection preparatory to removing the cover from the wheel, said resilient projections being positioned diametrically opposite each other, and a pair of plain axially extending resilient projections positioned midway between the aforementioned projections.

HARRY J. HORN.

REFERENCES CITED

The following references are of record in the file of this patent:

UNITED STATES PATENTS

| Number | Name | Date |
|---|---|---|
| 2,368,245 | Lyon | Jan. 30, 1945 |
| 2,551,327 | Horn | May 1, 1951 |